Figure 1:
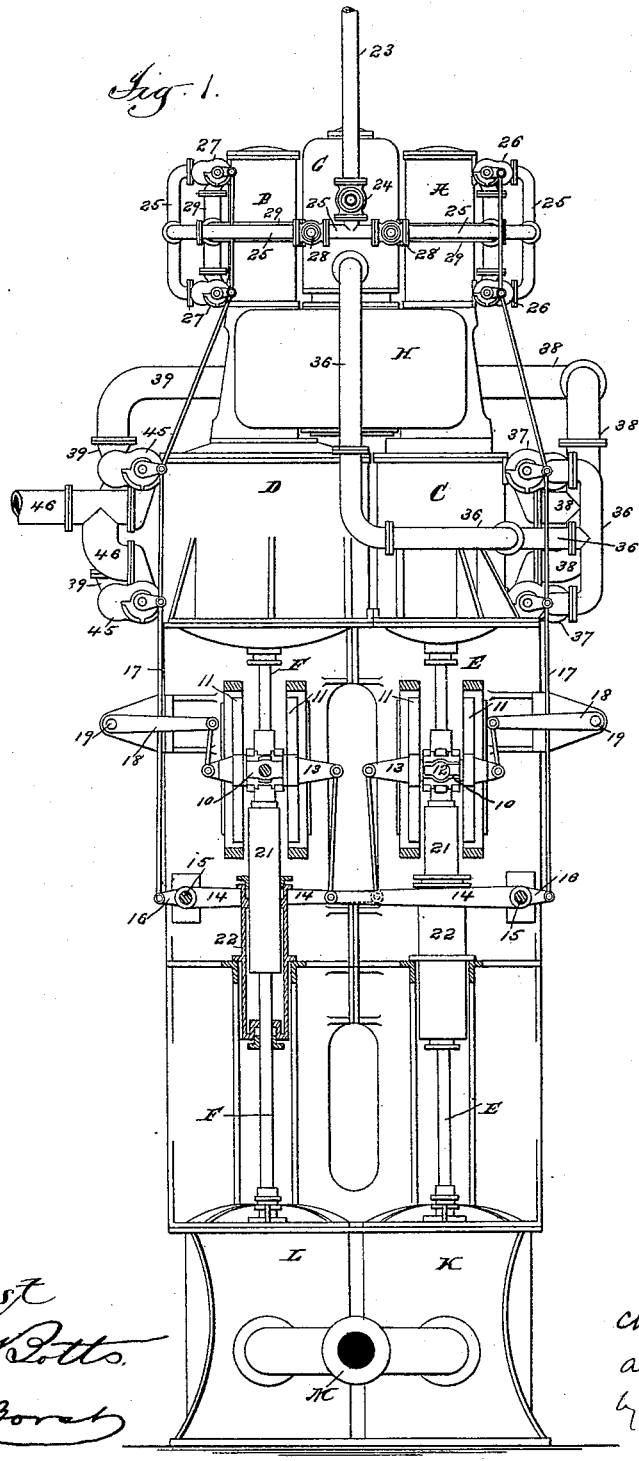

(No Model.) 7 Sheets—Sheet 1.

C. C. WORTHINGTON & A. J. CALDWELL.
DUPLEX ENGINE.

No. 444,543. Patented Jan. 13, 1891.

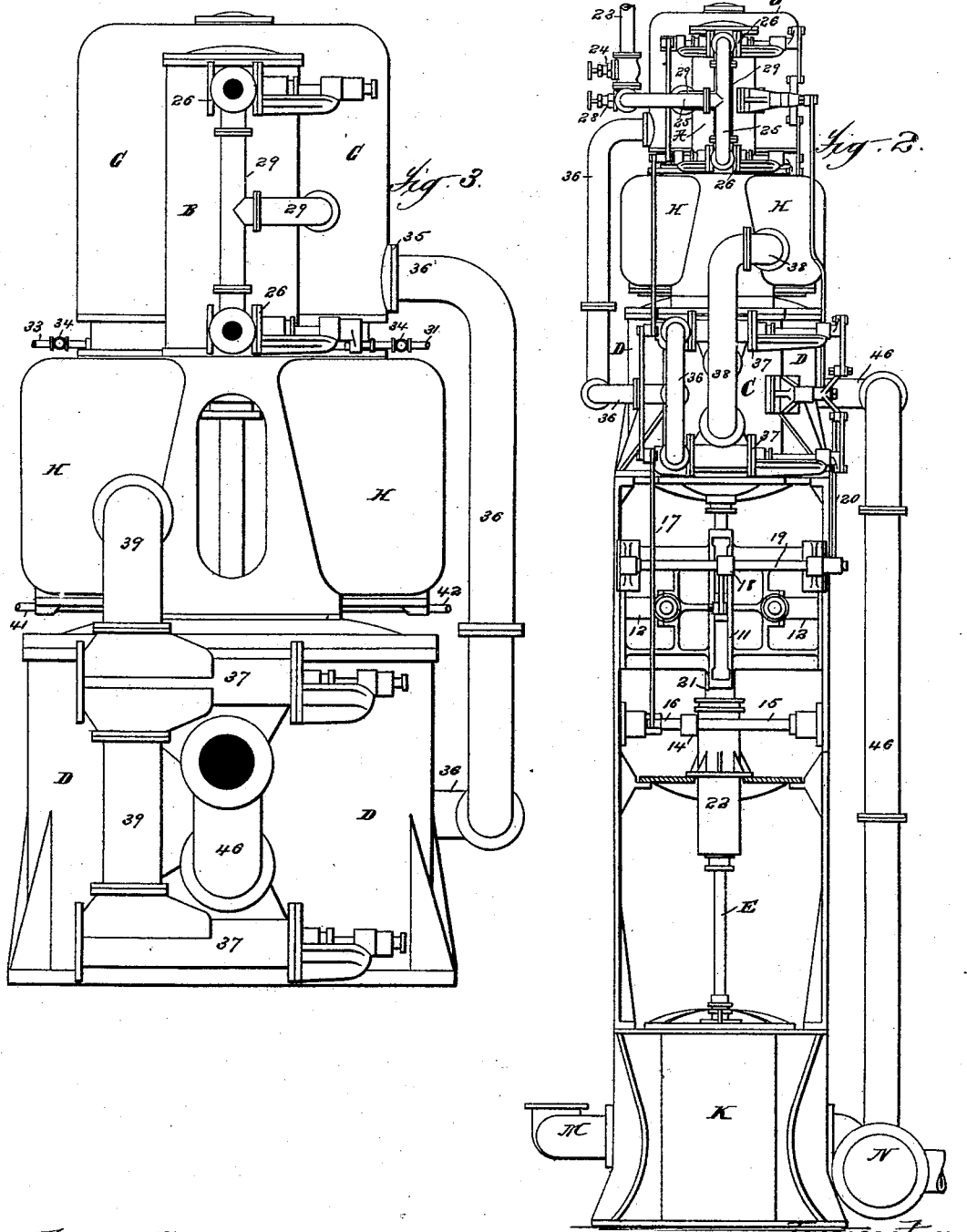

(No Model.) 7 Sheets—Sheet 3.

C. C. WORTHINGTON & A. J. CALDWELL.
DUPLEX ENGINE.

No. 444,543. Patented Jan. 13, 1891.

(No Model.) 7 Sheets—Sheet 4.

C. C. WORTHINGTON & A. J. CALDWELL.
DUPLEX ENGINE.

No. 444,543. Patented Jan. 13, 1891.

Attest:
Geo. H. Botts.

Inventors
Charles C. Worthington
Andrew J. Caldwell
by Philipp, Phelps & Hovey
Attys

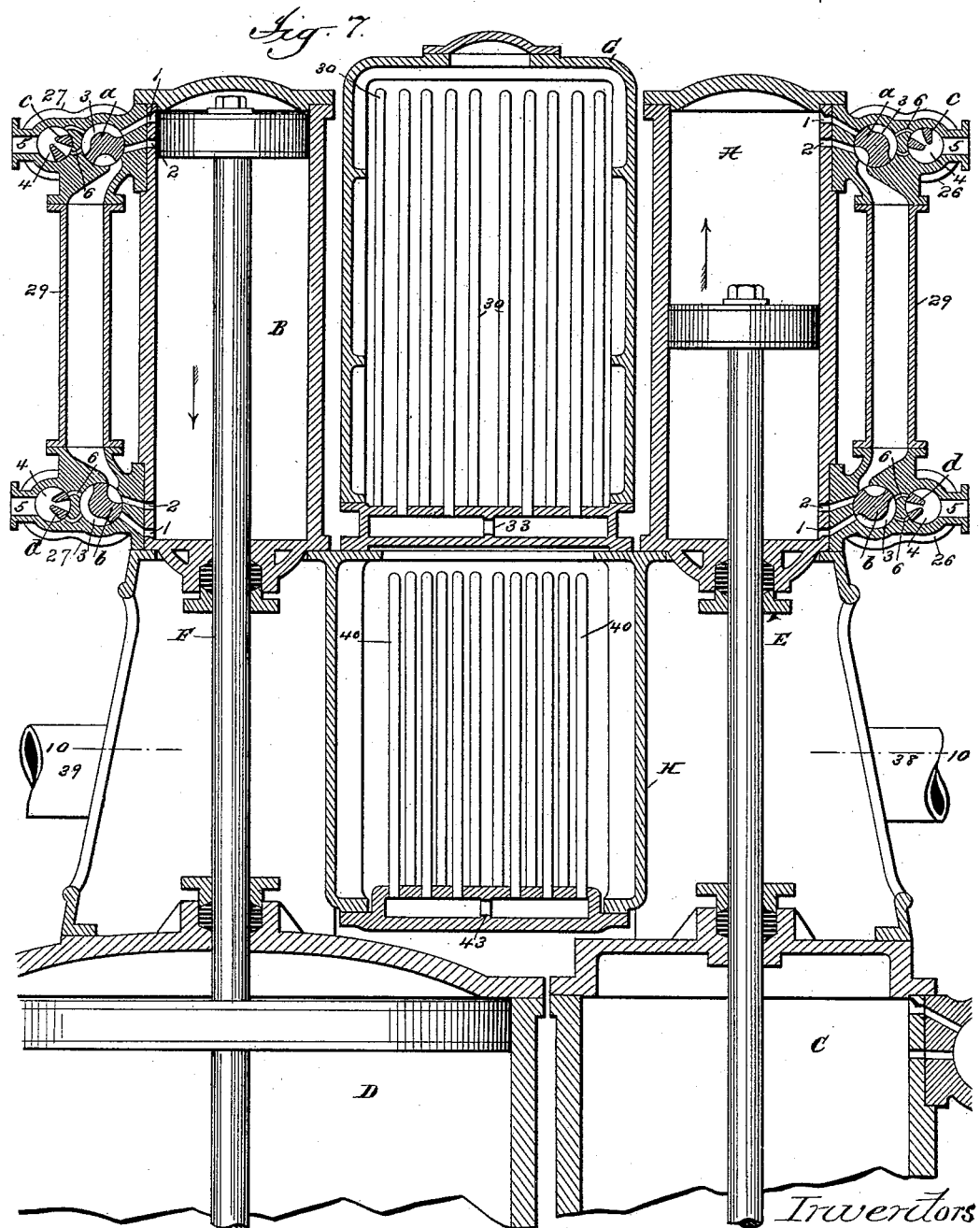

(No Model.) 7 Sheets—Sheet 6.
C. C. WORTHINGTON & A. J. CALDWELL.
DUPLEX ENGINE.
No. 444,543. Patented Jan 13, 1891.
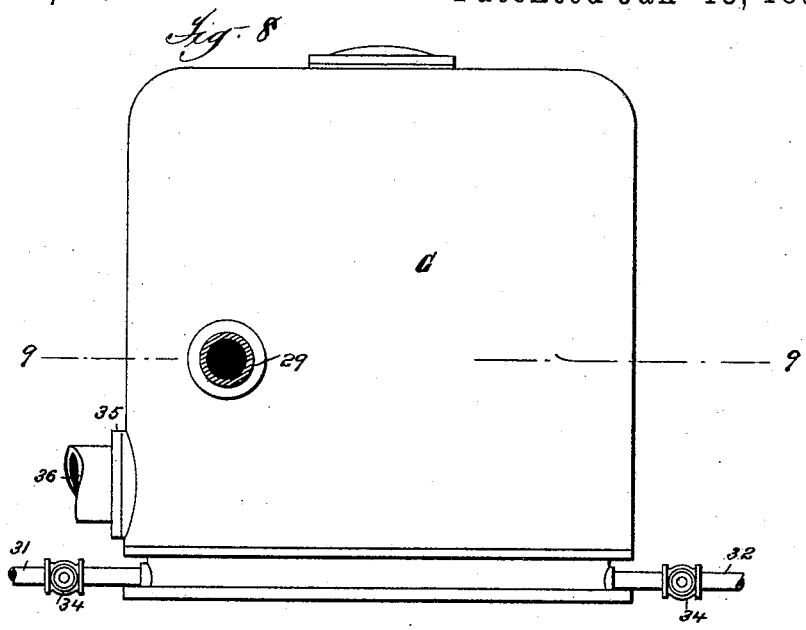
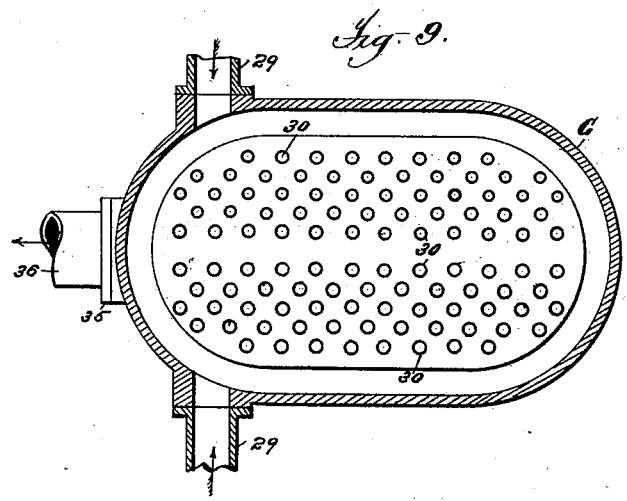

(No Model.)　　　　　　　　　　　　　　　　7 Sheets—Sheet 7.
C. C. WORTHINGTON & A. J. CALDWELL.
DUPLEX ENGINE.
No. 444,543.　　　　　　　　　　　Patented Jan. 13, 1891.
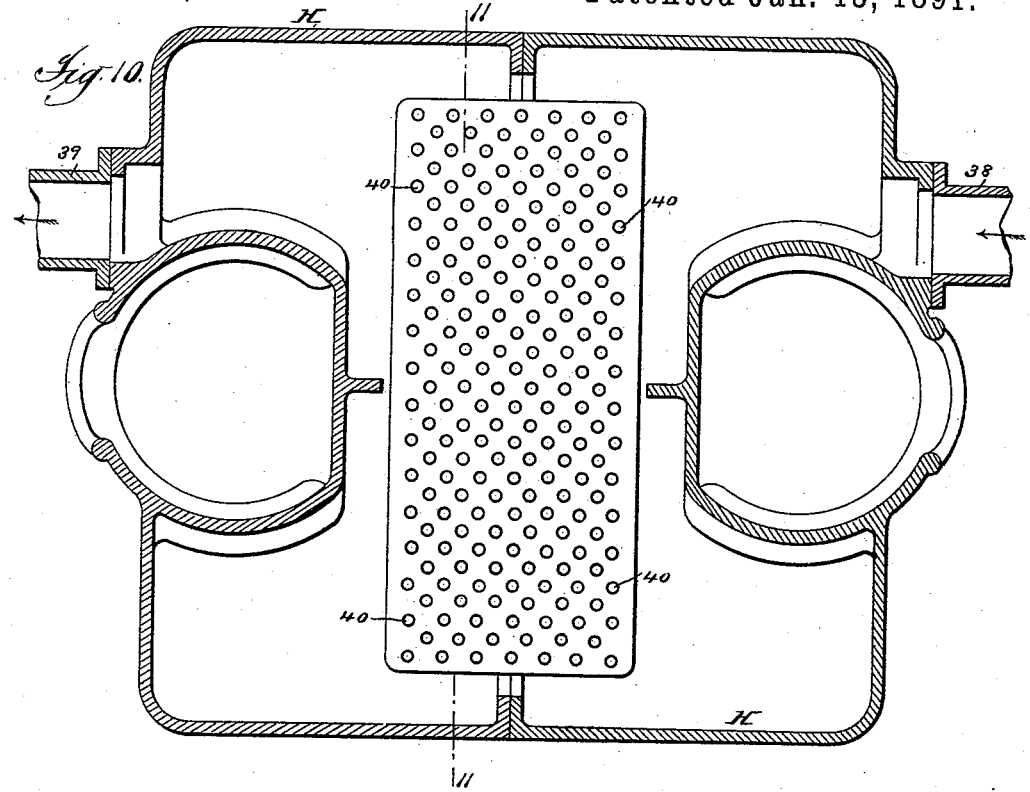
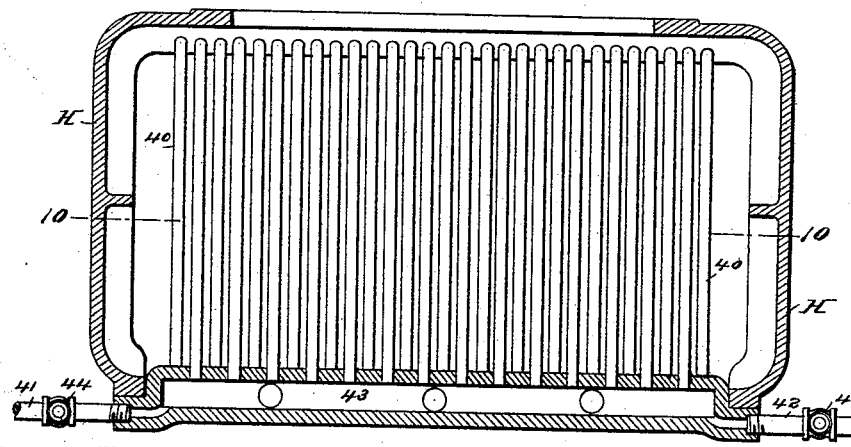
Attest:　　　　　　　　　　　　　　　　　Inventors
Geo. H. Potts.　　　　　　　　　　　Charles C. Worthington
　　　　　　　　　　　　　　　　　　　Aurrm J Caldwell
　　　　　　　　　　　　　　　　　by Philipp Phelps Honey
　　　　　　　　　　　　　　　　　　　　　　Attys

UNITED STATES PATENT OFFICE.

CHARLES C. WORTHINGTON, OF IRVINGTON, AND ANDREW J. CALDWELL, OF BROOKLYN, NEW YORK; SAID CALDWELL ASSIGNOR TO SAID WORTHINGTON.

DUPLEX ENGINE.

SPECIFICATION forming part of Letters Patent No. 444,543, dated January 13, 1891.

Application filed May 24, 1890. Serial No. 353,029. (No model.)

*To all whom it may concern:*

Be it known that we, CHARLES C. WORTHINGTON and ANDREW J. CALDWELL, citizens of the United States, residing, respectively, at Irvington, county of Westchester, State of New York, and Brooklyn, county of Kings, State of New York, have invented certain new and useful Improvements in Duplex Engines, fully described and represented in the following specification and the accompanying drawings, forming a part of the same.

This invention relates to direct-acting duplex engines, and especially to that class of engines known as the "Worthington duplex pumping-engine," which are described and shown in many prior Letters Patent, of which especial reference is made to the patents to C. C. Worthington, Nos. 292,525, 332,857, 341,534, and 401,401, the object of the invention being to increase the economy of such engines, while preserving the duplex arrangement, by providing a simple and compact arrangement of triple-expansion cylinders and receivers which will permit of a uniform and constant action on both sides of the engine.

To that end the invention consists, generally, of a duplex engine having two high-pressure steam-cylinders arranged one on each side and exhausting into a common receiver, from which an intermediate steam-cylinder, placed on one side, is supplied, the intermediate cylinder in turn exhausting into another receiver, from which a low-pressure steam-cylinder, placed at the other side of the engine, is supplied.

The invention consists, further, in providing the induction-pipes of the two high-pressure steam-cylinders of the construction constituting the general invention with separate throttles, by which the steam admitted to the high-pressure cylinders may be adjusted so as to secure an equal and constant effort on both sides of the engine, and in the arrangement of cut-off valves in the intermediate and low-pressure cylinders, so as to prevent a sudden accession of pressure therein at the end of the stroke, due to the exhaust of the cylinders on the other side of the engine into their respective receivers.

As the invention rests, chiefly, in the general construction and arrangement of the engine, a full understanding of the same can best be given by an illustration and a somewhat detailed description of an engine embodying the invention, and such description will now be given, reference being had to the accompanying drawings, forming a part of this specification, in which—

Figure 4:
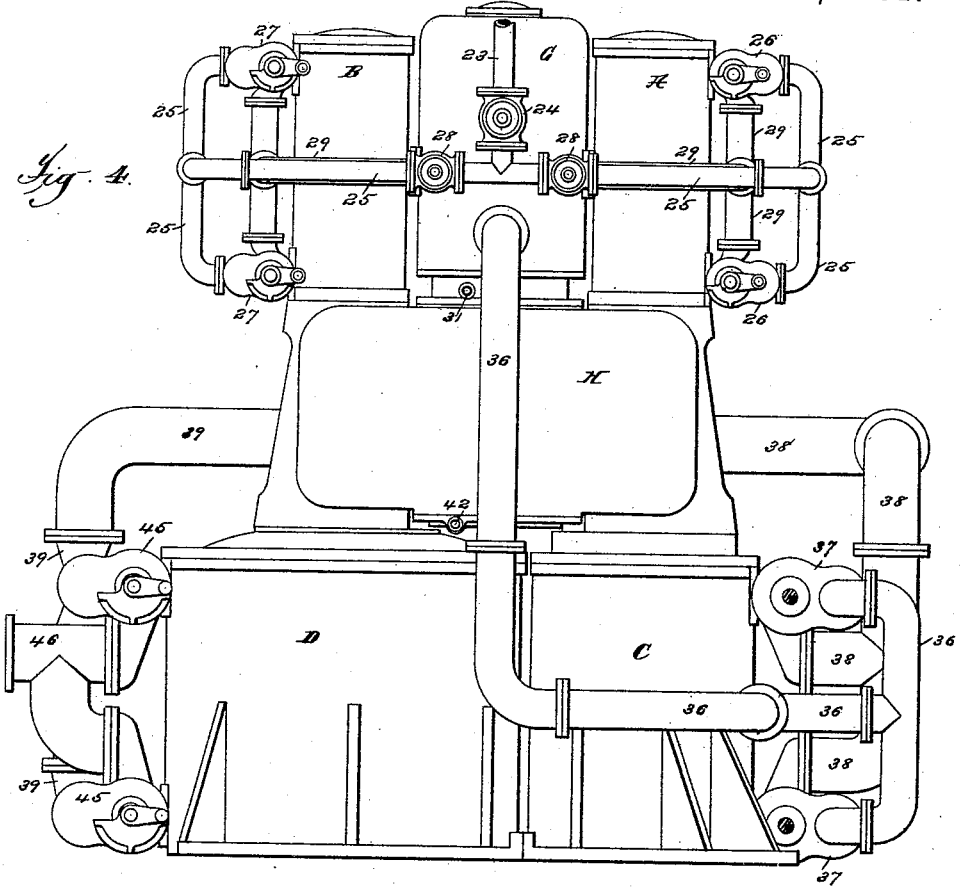
Figure 5:
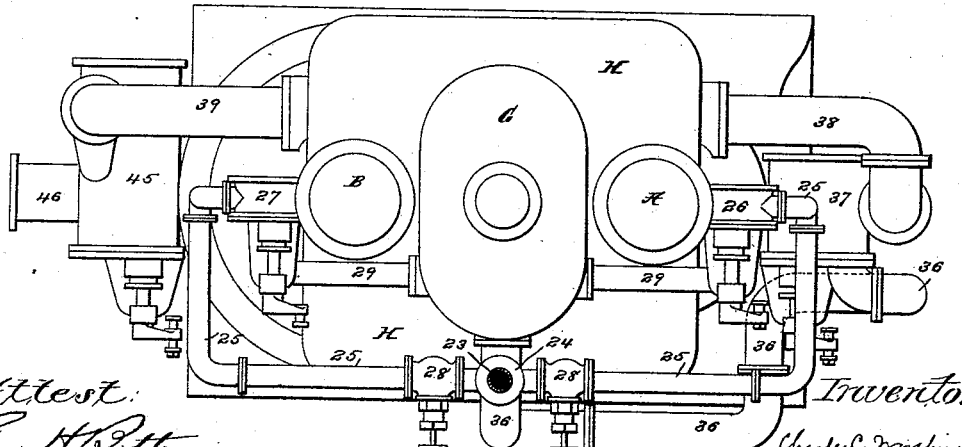
Figure 6:
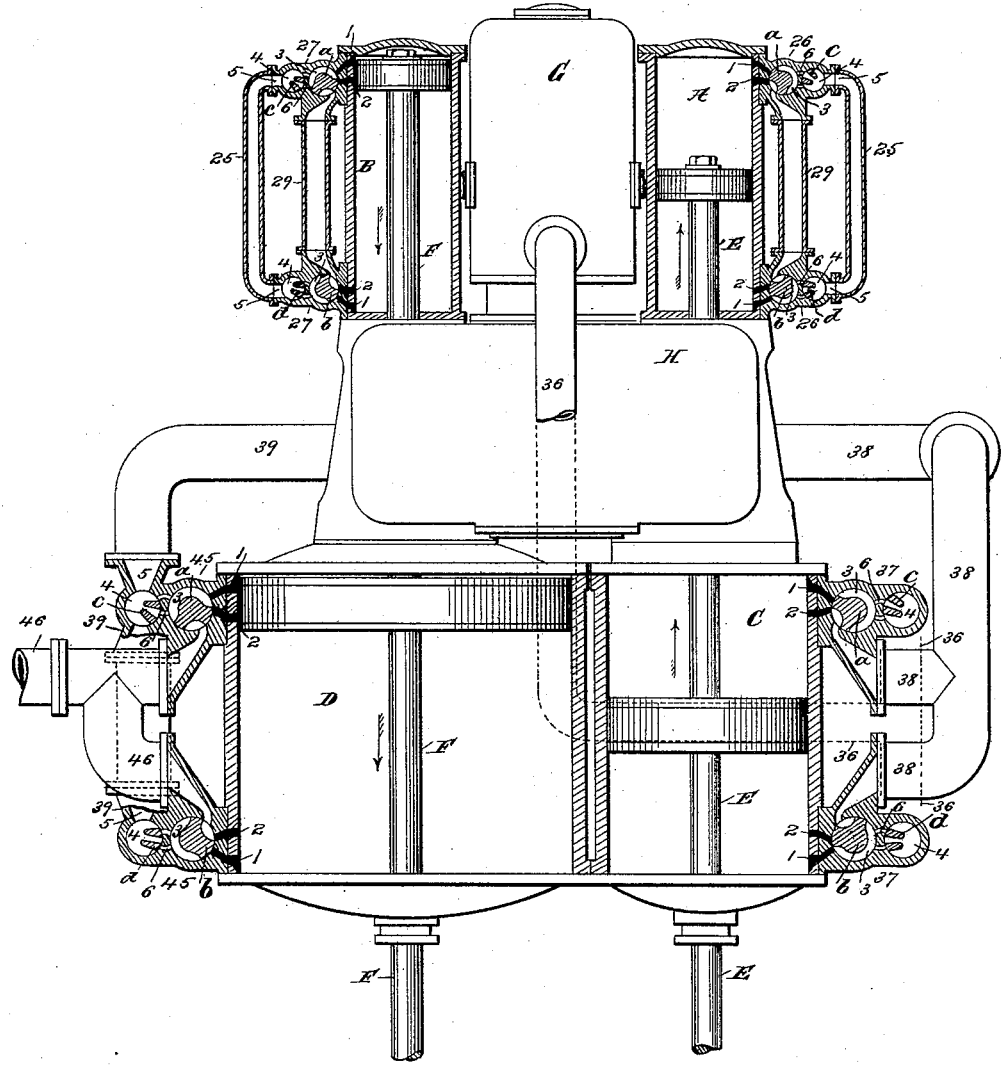

Figure 1 is a front elevation, partly in section, of a vertical duplex pumping-engine embodying our improvements. Fig. 2 is a side elevation of the same. Fig. 3 is an elevation of the steam end of the engine, taken on the side opposite that of Fig. 2. Fig. 4 is a front elevation of the steam end of the engine. Fig. 5 is a plan view. Fig. 6 is a diagram showing the arrangement of the cylinders and valves. Fig. 7 is a central vertical section of the high-pressure cylinders and tanks. Fig. 8 is an elevation of the upper tank. Fig. 9 is a horizontal section taken on the line 9 9 of Fig. 8. Fig. 10 is a horizontal section taken on the line 10 10 of Figs. 7 and 11, showing the construction and position of the lower tank. Fig. 11 is a vertical section taken on the line 11 11 of Fig. 10.

Referring to said drawings, it will be seen that the steam end of the engine consists of two high-pressure steam-cylinders A B, an intermediate cylinder C, and low-pressure steam-cylinder D, these four cylinders being arranged in pairs, the high-pressure cylinder A and intermediate cylinder C forming one side of the engine and having the common piston-rod E, and the other high-pressure cylinder B and low-pressure cylinder D forming the other side of the engine and having the common piston-rod F.

Between the cylinders A B is mounted a tank G, and between the cylinders A B and the cylinders C D is the tank H, which tanks form the receivers and will be more particularly described hereinafter.

The water end of the engine or pump proper consists of two water-cylinders K L, having plungers which are connected directly with the piston-rods E F at the opposite sides of the engine. These water-cylinders are of the usual construction, being provided with suction and force chambers, which communicate, respectively, with the suction-main M and force-main N, as usual.

Between the water-cylinders K L and the steam-cylinders C D the piston-rods E F are connected to cross-heads 10, sliding in fixed guides 11 and acted upon by the piston-rods of two pairs of oscillating compensating cylinders 12, having pistons which act in opposition to the main piston-rods during the first part of the stroke of the engine and in conjunction therewith during the last part of the stroke, the construction and arrangement of these cylinders being substantially the same as those of the patents above referred to. These cross-heads 10 are provided, also, with transverse arms 13, which are connected at their inner ends to the crank-arms 14 on the shafts 15, these shafts being provided with crank-arms 16, from which rods 17 extend to the cranks of the induction and eduction or exhaust valves of the engine, each piston-rod through this construction operating the induction and exhaust valves of the other side of the engine. The arms 13 are connected at their outer ends by links to the crank-arms 18 on shafts 19, which operate the cut-off valves of the engine through rods 20, the cut-off valves for each side of the engine being operated by the piston-rod of its own side. The arrangement and construction of these parts are those of the Patent No. 401,401, above referred to. The engine is provided, also, with the usual balancing-pistons 21, connected to the respective piston-rods E F and working in the cylinders 22, this construction being common in this class of engines and requiring no further description.

Returning to the steam end of the cylinder, a detailed description of the construction in which the present invention is embodied will be given. The high-pressure cylinders A B receive their supply of steam from steam-pipe 23, provided with a throttle 24 and communicating with the cylinders A B by means of induction-pipes 25, communicating with steam-chests 26 27 at the opposite ends of the cylinders. The induction-pipes 25 are each provided with a throttle 28, by which the amount of steam entering the respective cylinders A B may be independently regulated, for a purpose which will be hereinafter described.

The cylinders A B are provided with the usual exhaust-pipes 29, communicating with opposite ends of the cylinders, and exhaust into the tank G, placed between the two cylinders A B, as previously described, the exhaust from the cylinders A B entering the tank at opposite sides. This tank G, as shown in Figs. 7, 8, and 9, is provided with a port at each side, through which the exhaust-pipes 29 communicate with the tank, and with a series of reheater-tubes 30, through which steam is introduced by means of a feed-pipe 31, the steam after passing through the tubes escaping through a drain-pipe 32. The feed and drain ports are located in a chamber formed at the base of the tank, this chamber communicating with the reheater-tubes and being provided with a central perforated partition 33 to secure the slow circulation of the reheating-steam through the tank. The feed and drain pipes are controlled by cocks 34. The tank G is also provided with a nozzle 35, communicating with the induction-pipe 36, by which steam is supplied from tank G to the intermediate cylinder C through the steam-chests 37 at opposite ends of the cylinder. The cylinder C exhausts into the tank H through the exhaust-pipe 38, communicating with opposite ends of the cylinder. This tank H, as shown in Figs. 7, 10, and 11, is provided at opposite sides with ports communicating with the exhaust-pipe 38 of the intermediate cylinder C and with the induction-pipe 39 of the low-pressure cylinder D. The tank is provided, also, with a series of reheater-tubes 40, and receives steam through feed-pipe 41, the steam after passing through the tank escaping through the drain-pipe 42, the chamber with which these pipes connect being located at the base of the tank and divided by a partition 43, and the pipes being controlled by cocks 44, all as in tank G.

The tanks G H may be arranged in any desired manner, but will preferably be positioned as shown, the tank H being placed above and forming the heads of the intermediate and low-pressure cylinders C D, and providing, also, a support for the tank G, which is mounted directly above and upon it and between the high-pressure cylinders A B, this construction affording a compact and convenient arrangement of tanks and one enabling the induction and exhaust pipes forming the means of communication between the tanks and the cylinders to be placed so as to form a direct and short connection without interfering with other parts of the engine. The induction-pipe 39 from the tank H communicates with the low-pressure cylinder D through the steam-chests 45 at the opposite ends of the cylinder. The low-pressure cylinder D exhausts through a pipe 46, communicating with a condenser or the open air, according to the type of engine.

The valve apparatus may be of any suitable construction, but preferably is of the form shown, which, however, forms no part of the present invention, but is substantially the same as that of Patent No. 401,401, above referred to. As the construction and operation of these valves are the same as those of the patent just referred to, a brief general description of these parts will suffice, and as the general construction of the valves of all the cylinders is the same the same reference-letters will be used for the different cylinders.

Referring now particularly to Figs. 6 and 7, each of the cylinders is provided at its opposite ends with induction-ports 1 and exhaust-ports 2, the exhaust-ports being placed, as is usual, somewhat nearer the middle of the cylinder than the induction-ports in order to provide a cushion or dash for the piston. The induction and exhaust ports are controlled by a pair of oscillating induction and exhaust valves $a\ b$, located in cavities 3 in the valve-chests at the opposite ends of the cylinders. These valve-chests also contain cavities 4 outside the induction and exhaust valves, which communicate with the induction-pipes for the respective cylinders by means of the ports 5 and with the cavities of the induction and exhaust valves by one or more ports 6, which are controlled by one or more cut-off valves $c\ d$ at opposite ends of the cylinder. These cut-off valves $c\ d$ oscillate in the cavities 4, and preferably are of the gridiron form, as shown, this form, together with the plurality of ports, securing a quick cut-off, as described in the patent above referred to.

The induction and exhaust valves $a\ b$ are provided with stems and crank-arms and are operated by rods 17, connected to the respective piston-rods, as previously described, the induction and exhaust valves for each side of the engine being operated by the piston-rod for the opposite side, and the cut-off valves are similarly connected to the operating-rods 20, the cut-off valves at each side of the engine being operated by the piston-rod for its own side, all as in Patent No. 401,401.

The function and operation of the valves of the high-pressure cylinders A B differ in no respect from those of the patent just referred to and need but a brief description. As the piston E of the cylinder A completes its stroke away from the water-cylinders the valves $a\ b$ will be in such a position as to close the induction-port at one end of the cylinder and open the exhaust-port at the other end of the cylinder, and at the same time, through the cross-head 10 and the connections which have been described, the movement of the induction and exhaust valves of the cylinder B has been completed, so as to start the piston of that cylinder and cause it to make a stroke in the same direction. As the piston of the cylinder B makes its stroke it will, through the piston-rod F, cross-head 10, and connections previously described, oscillate valves $a\ b$ of the cylinder A, and as the piston-rod arrives at the middle of its stroke the valves of the cylinder A will arrive in their mid-position, in which they close the induction and exhaust ports of the cylinder, and the continued movement of the piston-rod F will immediately commence to open the induction-port at one end of the cylinder A and the exhaust-port at the other end, and as the piston of cylinder B completes its stroke the valves of cylinder A will arrive in such a position as to completely open the induction-ports 1 in front of the piston of cylinder A and the exhaust-ports 2 behind it. The piston of cylinder A will then commence its stroke, and as it arrives at the middle or about the middle of the stroke it will, through the piston-rod E and cross-head 10 and the connections previously described, operate the cut-off valves $c\ d$ to close the port 6 and cut off the further admission of live steam in front of the piston and at the same time open the port 6 at the opposite end of the cylinder to permit the admission of live steam for the next stroke.

The main and cut-off valves of the intermediate and low-pressure cylinders C D are operated through the same connections as the valves of the high-pressure cylinders A B, and generally in the same manner as those of the low-pressure cylinders in the patent above referred to. The cut-off valves, however, in the engine embodying the present invention perform an important function, differing from that of the cut-off valves of the patent above referred to. The cut-off valves of the high-pressure cylinders A B in this engine and of the low-pressure cylinders of the patent perform simply the function of cutting off the steam at or about the middle of the stroke of the piston in order that the steam may be used expansively during the latter part of the stroke, this being a feature common in high-duty engines. As the supply of steam is uniform, however, the continuous admission of steam throughout the stroke would not interfere with the steady and uniform action of the engine. In the present case, however, in which the high-pressure cylinder B exhausts into the tank G toward the end of the stroke of the piston of the intermediate cylinder C, a sudden accession of pressure would be caused in the cylinder C, thus producing a sudden increase in the force operating the piston and disturbing the equal and uniform action of the engine. In the same way the exhaust of the intermediate cylinder C into the tank H toward the end of the stroke of the piston of low-pressure cylinder D would produce a sudden accession of pressure in the latter cylinder and a disturbance in the action of the engine. The cut-off valves $c\ d$ at opposite ends of the cylinders C D operate to prevent this sudden accession of pressure, these valves being so timed in their action, as shown in Fig. 6, as to operate to cut off the supply of steam from the respective tanks G H at the proper time to prevent the exhaust from the tanks G H from affecting the steam-supply of the respective cylinders C D. An equal and uniform action of the engine at every point of the stroke is thus secured, each of the cylinders C D being compelled to receive its entire supply of steam from its tank prior to the exhaust of the cylinder on the opposite side of the engine, which communicates with the tank.

It is necessary in this class of engines that the two sides of the engine should have a regular and uniform movement at all times and that the total effective power on the two sides of the engine should be equal and constant, any variation in the power on one side relatively to that of the other side causing a disturbance in the action of the engine and preventing the attainment of the greatest economy in its operation.

It is apparent that in the construction shown and described the admission of the same amount of steam to each of the high-pressure cylinders A B may produce an inequality in the action of the engine, due to the fact that the effective power in cylinder D in combination with that in cylinder B will not under certain conditions be equal to that of the combined effective power in the cylinders A and C. This is especially the case in starting the engine, the steam from cylinders A B passing to cylinder C through the tank and exhaust-pipe, so as to produce in cylinder C a pressure prior to the accession of pressure in cylinder D. The combined pressure upon the pistons in the cylinders A C will therefore be in excess of that upon the opposite side of the engine, the steam acting upon the cylinder B with a pressure equal to that upon the piston of cylinder A, and it will be some time before an equality of power will be established in the cylinders on opposite sides, during which time the action of the engine is not uniform and steady. In the same way, in case of any change of water-pressure by which an excess or deficiency of pressure in cylinder D is produced, the balance between the two sides of the engine will be destroyed and the action rendered uneven. It is desirable, therefore, that some means should be furnished whereby the effective power upon the opposite sides of the engine may be equalized at the starting of the engine and adjusted readily at all times. For this purpose we provide the induction-pipes 25 with throttles 28, by which the amount of steam entering each of the cylinders A B may be readily adjusted, so that the effective power upon the two sides of the engine shall be uniform and any variation therein quickly corrected. The operation of these throttles will be readily understood. In starting the engine both throttles will be used and more or less steam be admitted to the respective cylinders A B until a uniform action of the engine is secured, it being apparent that an excess of steam will first be required in cylinder B to balance the excess of power on the other side of the engine, due to the power exerted upon the piston of cylinder C, and that this excess of steam will be gradually reduced as the cylinder D receives its supply from tank H until the supply of steam to cylinder B is equal or nearly equal to that of cylinder A. Similarly, in case of any unevenness in the action of the engine after starting, due to any excess or deficiency of pressure in cylinder D, the amount of steam admitted to cylinders A B may readily be adjusted by the throttles so as to compensate therefor.

Our improvements have been illustrated in connection with a vertical high-duty engine. For a vertical low-duty engine the same general arrangements will evidently pertain, the only difference being in the absence of the high-duty attachment, involving a change in the proportioning of the size of the steam cylinders and tanks, and the omission of the cut-off valves upon the high-pressure cylinders, these valves being retained, however, on the intermediate and low-pressure cylinders, for the purpose previously described. It is evident that the same general arrangement may be applied to a horizontal high or low duty engine. In the latter case the tanks may be arranged in any desired position, but will preferably be constructed to form a portion of the foundation upon which the intermediate and low-pressure cylinders rest, thus economizing in space and affording means for a convenient and short connection between the tanks and the cylinders.

What we claim is—

1. In a duplex engine, the combination, with two high-pressure cylinders, of an intermediate and a low-pressure cylinder, each forming with one of the high-pressure cylinders a side of the engine, and two receivers, through one of which the exhaust from both high-pressure cylinders passes to the intermediate cylinder and through the other of which the exhaust from the intermediate cylinder passes to the low-pressure cylinder, substantially as described.

2. In a duplex engine, the combination, with two high-pressure cylinders, of an intermediate and a low-pressure cylinder, each forming with one of the high-pressure cylinders a side of the engine, two receivers, through one of which the exhaust from both high-pressure cylinders passes to the intermediate cylinder and through the other of which the exhaust from the intermediate cylinder passes to the low-pressure cylinder, and cut-off valves controlling the supply from the receivers to the intermediate and low-pressure cylinders, substantially as described.

3. In a duplex engine, the combination, with two high-pressure cylinders, of an intermediate and a low-pressure cylinder, each forming with one of the high-pressure cylinders a side of the engine, two receivers, through one of which the exhaust from both high-pressure cylinders passes to the intermediate cylinder and through the other of which the exhaust from the intermediate cylinder passes to the low-pressure cylinder, and cut-off valves operated late in the strokes of the intermediate and low-pressure cylinders to prevent the sudden accession of pressure from the exhaust of the cylinder on the opposite side of the engine, substantially as described.

4. In a duplex engine, the combination, with two high-pressure cylinders, of an intermediate and a low pressure cylinder, each forming with one of the high-pressure cylinders a side of the engine, two receivers, through one of which the exhaust from both high-pressure cylinders passes to the intermediate cylinder and through the other of which the exhaust from the intermediate cylinder passes to the low-pressure cylinder, and valves for controlling the amount of steam admitted to each of the high-pressure cylinders, substantially as described.

5. In a duplex engine, the combination, with the high-pressure cylinders at opposite sides of the engine, of a receiver through which the exhaust passes to a cylinder on one side of the engine only, substantially as described.

6. In a duplex engine, the combination, with the high-pressure cylinders at opposite sides of the engine, of a receiver placed between the cylinders, through which the exhaust from both cylinders passes to a cylinder on one side of the engine only, substantially as described.

7. In a duplex engine having two cylinders at each side, the combination, with the cylinders, of two receivers, through one of which the exhaust from one cylinder on each side passes to a third cylinder on one side and through the other of which the exhaust from the third cylinder passes to the fourth cylinder on the opposite side, substantially as described.

8. In a vertical duplex engine, the combination, with two cylinders at each side of the engine, of two receivers through which the exhaust passes, the lower receiver being placed above and forming the heads of the lower pair of cylinders and the upper receiver being supported upon the lower receiver and between the upper pair of cylinders, substantially as described.

In testimony whereof we have hereunto set our hands in the presence of two subscribing witnesses.

CHARLES C. WORTHINGTON.
ANDREW J. CALDWELL.

Witnesses:
LOUIS R. ALBERGER,
B. W. PIERSON.